April 15, 1924.

M. W. STOMS

COMPRESSOR VALVE

Filed July 21, 1921    2 Sheets-Sheet 1

1,490,141

INVENTOR
Marion W. Stoms.
BY Arthur C. Brown.
ATTORNEY

April 15, 1924.

M. W. STOMS

COMPRESSOR VALVE

Filed July 21, 1921   2 Sheets-Sheet 2

1,490,141

INVENTOR
Marion W. Stoms.
BY
Arthur L. Brown.
ATTORNEY

Patented Apr. 15, 1924.

1,490,141

UNITED STATES PATENT OFFICE.

MARION W. STOMS, OF KANSAS CITY, MISSOURI, ASSIGNOR OF ONE-HALF TO LEIGH W. MORRIS, OF KANSAS CITY, MISSOURI.

COMPRESSOR VALVE.

Application filed July 21, 1921. Serial No. 486,554.

*To all whom it may concern:*

Be it known that I, MARION W. STOMS, a citizen of the United States, residing at Kansas City, in the county of Jackson and State of Missouri, have invented certain new and useful Improvements in Compressor Valves; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to compressors and particularly to a valve mechanism therefor, the primary object being to provide a valve having a maximum port area or valve opening with a minimum lift.

Another object is to provide a valve which is light enough to operate at high speeds without pounding or hammering against its seat and yet be rugged enough to withstand the stresses under which it must work.

It is also an object of the invention to provide a valve which is so cushioned as to be practically silent in operation and to give the least possible unbalanced area between its opposite sides.

I have shown the generic principle in a suction valve as well as a discharge valve, the suction valve, it being understood, is used in compressors permitting the passage of gas or air into the compressor cylinder and to prevent the escape of the gas or air from the cylinder after having filled the compression chamber, the valves being generally located in the piston.

Such valves should have openings as large as possible so as to permit the air or gas to fill the compression chamber of the cylinder with the least possible friction and without wire drawing so that the 'valve will open when the pressure in the compression chamber of the cylinder does not exceed the inlet pressure.

The discharge valves are used on compressors permitting the passage of gas or air out of the compressor cylinder into the discharge line after the gas or air has been compressed to a pressure equal to or above that exhausted in the discharge line. These valves are usually located in the cylinder heads or cylinder walls.

It sometimes happens that a slug of liquid is drawn into the cylinder and into the compression chamber of the compressor so that when the piston moves into compressing position, there is danger of the cylinder head being broken off. I have provided means whereby this disadvantage will be entirely eliminated because the discharge valve is carried by a normally seated movable valve cage which, upon abnormal pressure, will unseat to allow the escape of the compressed charge in the compression chamber of the compressor and thereby relieve the pressure so as to eliminate the danger of disruption or blowing off of the cylinder head.

Other novel features of the invention will be apparent by reference to the following description in connection with the accompanying drawings, in which—

Figure 1:
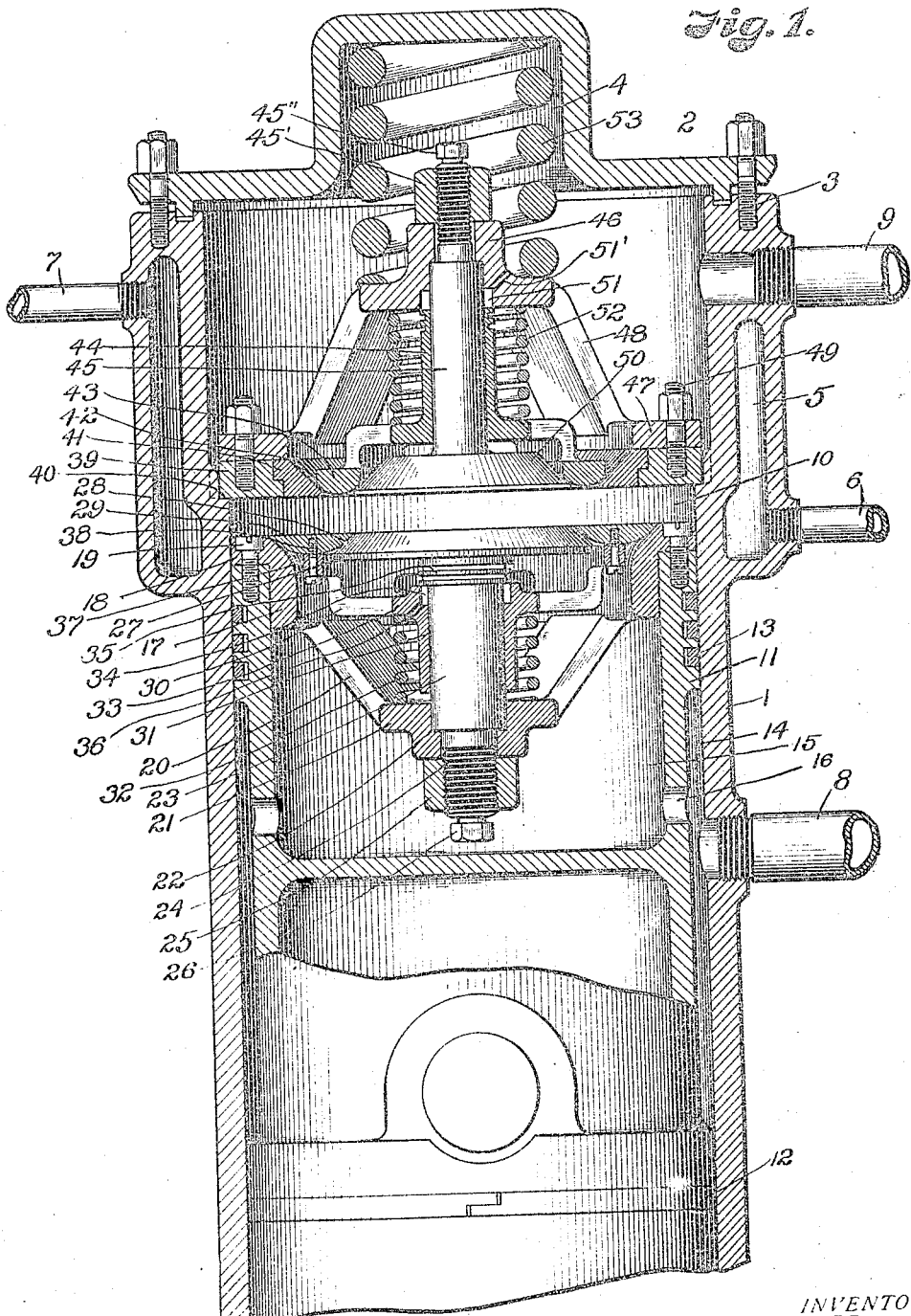
Fig. 1 is a vertical, longitudinal, sectional view through a compressor having a valve mechanism for the piston and a valve mechanism for the cylinder head constructed in accordance with my invention.

The compressor cylinder 1 is closed by a removable cylinder head 2, fastened to the cylinder wall by the fastening bolts 3, and the head 2 is provided with a spring seat or recess 4. The portion of the cylinder to receive the compressed charge is provided with a water jacket 5, provided with an inlet pipe 6 and with an outlet pipe 7 so that cooling water can be admitted to the jacket and flow therefrom. The cylinder is also provided with an inlet port 8 and a discharge port 9, between which within the cylinder is the compression chamber 10. The trunk piston 11 is of conventional design, such as commonly used in the enclosed crank case type of ammonia compressor. The piston has sliding contact with the cylinder wall 1 by reason of the piston rings 12 and 13, there being an annular space 14 intermediate the ends which communicates with the intake pipe 8 and with the suction chamber 15 of the piston through the ports 16.

The suction and compression end of the piston is closed by a valve cage shown as comprising a ring 17 having a lateral flange 18 fastened to the end of the piston by the machine screws 19. The ring 17 has inwardly inclined spider arms 20 connected by the ring 21 so that a valve cage is provided. The ring 21 is provided with a seat 22 to receive the post 23, which is provided with a threaded end 24 extending through the ring and secured by the jam nut 25, there being preferably a lock device 26 extending into the threaded end to expand the ends into the nut 25.

The post 23 carries a disk 27 having a beveled or chamfered perimeter 28, spaced from the upper portion of the ring 17 to provide an annular port adapted to be closed by the ring-shaped valve 29, flat on its outer face and convex on its inner face. The ring-shaped valve 29 is secured to the spider arms 30 of the reciprocatory sleeve 31 on the post 23 and the weight being properly balanced by a spring 32 interposed between the collar 33 and the ring 21. The sleeve 31 is provided with a recess 34, co-extensive with the projections or pistons 35 on the post 23 so that the valve will be cushioned when moving in either direction, there being a port 36 in the sleeve to admit air into or discharge air out of the recess 34 but at such a slow rate that suction or compression will be created therein in time to retard the movement of the valve and prevent its clacking or pounding upon the valve seat consisting of the ring 17 and the disk 27, and prevent the sleeve 31 from pounding against the pistons 35.

The spider arms 30 are connected at their outer ends by a ring 37 to which the valve 29 is directly secured by the screws 38. When the piston is moving on its suction stroke, the gas or air will be admitted through pipe 8 into the annular recess 14 and through port 16 into the chamber 15 and unseat the valve 29 so that it may enter the compression chamber 10. On the compression stroke of the piston, the valve 29 will seat, during which time the sleeve 31 will reciprocate on the post 23 but slowly due to the cushioning effect of the piston 35 and the recess 34 in the sleeve.

When the charge is compressed it will pass through the discharge valve into the pipe 9. The discharge valve is shown as provided with a valve cage comprising a ring 39, normally resting upon the shoulder 40 of the cylinder. The ring 39 carries a shouldered ring 41 having a concaved edge 42 providing a valve seat for the ring valve 43, which is on a sleeve 44 reciprocally mounted on the post 45 seated in the collar 46 connected to the ring 47 by the spider arms 48, the ring 47 being fastened to the ring 39 by bolts 49, and the post 45 being fastened in the collar 46 by nut 45' and locking device 45".

The post 45 carries a disk 50, which is spaced from the ring 41 to form part of the valve seat for the valve 43. The sleeve 44 may reciprocate on the post 45 and its movement will be cushioned by the recess 51 having the vent 51' in the ring 46 in either direction, and the spring 52 surrounding the sleeve bearing against the spider at one end and the collar 46 at the other for returning the valve to its seat, as will be clearly apparent by reference to Fig. 1.

There is a spring 53 in the recess 4, which bears against the collar 46 to normally hold the valve cage seated on the shoulder 40.

Under normal conditions when the piston moves to its compression stroke, the valve 43 will be unseated, allowing the air or gas to pass into the pipe 9. If, however, a slug of liquid is drawn into the cylinder or part of the suction valve becomes loose and is forced upwardly by the piston, the valve cage for the discharge valve which constitutes a false head, will lift from its shoulder or seat and allow the piston its required stroke without forcing off the head of the cylinder or wrecking some other part of the machine. When the piston starts on its intake or suction stroke, the spring 53 will force the safety head or valve cage for the discharge valve upon its seat so that the compressor may continue to work under abnormal conditions.

The cushion or chambered positions in the sleeves and collar are so arranged that when the ring valves lift, a quantity of gas or air is trapped in the box by the plungers and forced through the vent at the end of the cushion box. This trapped gas cushions the valve on its lift. When the ring valve returns to its seat, the plunger recedes from the box and draws air or gas into the cushion box but the vent is too small to let in the air or gas quickly enough, so a partial vacuum is produced in the cushion box which prevents the valve ring from seating with a pound, clack or hammer. Therefore, the valves will be practically silent in operation, they will last longer because they will not be subjected to the fatal effect of pounding or hammering, and the construction is such that the valve ports have the maximum effective area so as to permit the air and gas to fill the cylinder with the least possible friction and wire drawing and liability of the valves unbalancing will be practically eliminated.

Figure 2:
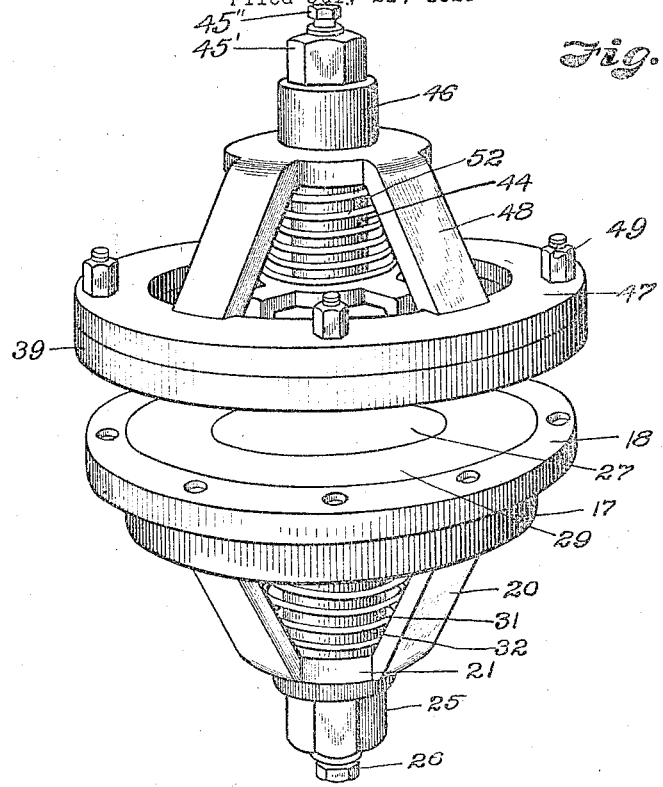
Fig. 2 is a disassociated view of the two valve mechanisms.
Figure 3:
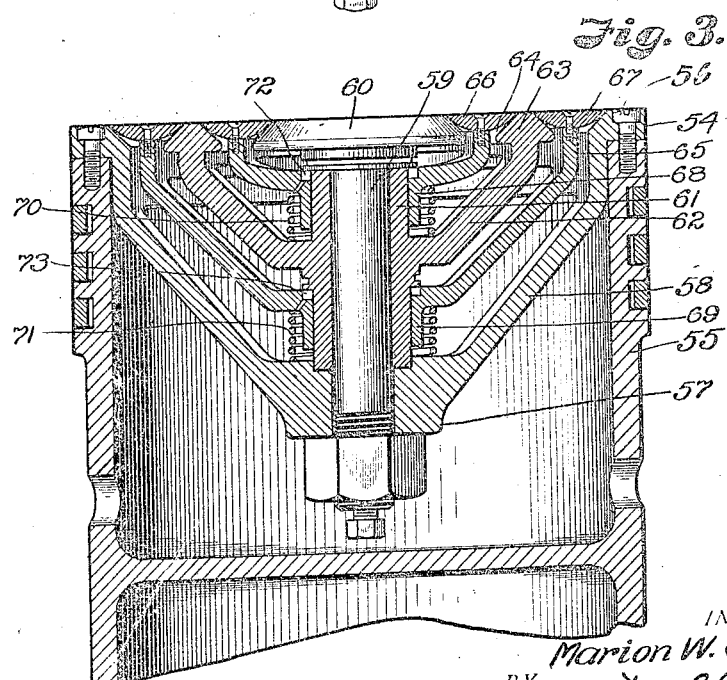
Fig. 3 is a slightly modified form of suction valve mechanism.

In Fig. 3 I have shown a slightly modified form of suction valve in which the valve cage 54 is fastened to the trunk piston 55 by machine screws 56 and it is provided with a collar 57 connected by the inclined spider arms 58. A post 59 is rigid with the collar 57 and carries a disk 60. The post 59 has a sleeve 61 rigid thereon with upstanding spider arms 62, carrying a double-edged ring 63 spaced from the disk 60 and from the ring 54 so that two annular ports 64 and 65 are provided, these being normally closed by the ring valves 66 and 67, similar to the valves heretofore described. These valves are mounted on reciprocatory sleeves 68 and 69 which slide on the sleeve 61, being balanced by the springs 70 and 71 and having cushion boxes 72 and 73 for cushioning the valves in either direction. The generic principle involved in the construction shown in Fig. 3 is substantially like that shown in the preferred form except that multiple valves are used instead of single ring valves, as shown in Figs. 1 and 2.

It will be apparent from the foregoing that a compressor constructed in accordance with my invention will efficiently operate without liability of encountering the disadvantages above enumerated as objectionable and that liability of the cylinder head being broken off due to slugs of liquid or the like entering the compression chamber or on account of broken parts will be entirely eliminated.

What I claim and desire to secure by Letters-Patent is:

1. In combination, a valve cage comprising a ring having inwardly inclined spider arms, a collar connecting the inner ends of the spider arms, a member rigid with the collar and co-operating with the ring to provide an annular valve port, a sleeve slidable on the rigid member, and a ring-shaped valve rigid with the sleeve to open and close the port, the ring and member having beveled edges and the valve having a flat face and a convex face, the convex face seating on the beveled edges when the port is closed.

2. In combination, a valve cage comprising a ring having inwardly inclined spider arms, a collar connecting the inner ends of the spider arms, a member rigid with the collar and co-operating with the ring to provide an annular valve port, a sleeve slidable on the rigid member, a ring-shaped valve rigid with the sleeve to open and close the port, a dash pot opposing the movement of the sleeve in one direction, and a spring opposing the movement of the sleeve in the opposite direction.

3. In combination, a valve cage comprising a ring having inwardly inclined spider arms, a collar connecting the inner ends of the spider arms, a member rigid with the collar and co-operating with the ring to provide an annular valve port, a sleeve slidable on the rigid member, a ring-shaped valve rigid with the sleeve to open and close the port, and means for yieldingly supporting the valve cage.

4. In a compressor valve mechanism, a cylinder and a piston having an inlet valve, a shoulder in the cylinder, a discharge valve cage on the shoulder, a spring, one end of which bears against the cylinder head and the other against the valve cage, an annular port in the valve cage, a spring-pressed ring valve for closing the port and guiding means rigid with the ring valve.

5. In a compressor valve mechanism, a cylinder and a piston having an inlet valve, a shoulder in the cylinder, a discharge valve cage on the shoulder, a spring, one end of which bears against the cylinder head and the other against the valve cage, an annular port in the valve cage, a spring-pressed ring valve for closing the port, and a dash pot for opposing the movement of the valve.

In testimony whereof I affix my signature.

MARION W. STOMS.